United States Patent
Gardynik et al.

(10) Patent No.: US 10,345,122 B2
(45) Date of Patent: Jul. 9, 2019

(54) MECHANICAL FORCE GAUGE

(71) Applicant: Ford Global Technologies, LLC, Dearborn, MI (US)

(72) Inventors: Michael J. Gardynik, Farmington Hills, MI (US); Kevin Joseph Favero, Plymouth, MI (US); Danny P. Manginen, Canton, MI (US); Daniel Trentin, Ivanhoe Vic (AU)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 520 days.

(21) Appl. No.: 15/150,879

(22) Filed: May 10, 2016

(65) Prior Publication Data
US 2017/0328744 A1    Nov. 16, 2017

(51) Int. Cl.
*G01D 11/24* (2006.01)
*G01L 1/04* (2006.01)
*B65G 49/04* (2006.01)

(52) U.S. Cl.
CPC .......... *G01D 11/245* (2013.01); *G01L 1/042* (2013.01); *B65G 49/0454* (2013.01)

(58) Field of Classification Search
CPC .... G01L 1/042; G01D 11/245; B65G 49/0454
See application file for complete search history.

(56) References Cited

U.S. PATENT DOCUMENTS

| 4,103,881 | A * | 8/1978 | Simich | F16F 1/128 248/623 |
| 4,466,210 | A * | 8/1984 | Koontz | F41C 9/085 42/90 |
| 6,773,000 | B2 * | 8/2004 | Oyama | F16F 1/128 267/136 |
| 9,140,325 | B2 * | 9/2015 | Cox | B60G 15/063 |
| 9,186,949 | B2 * | 11/2015 | Galasso | F16F 9/3292 |
| 2007/0221054 | A1 * | 9/2007 | Webster | F15B 15/1409 91/394 |
| 2011/0232147 | A1 * | 9/2011 | Zoellner | F41C 9/085 42/1.01 |

FOREIGN PATENT DOCUMENTS

FR   2389114 A1 * 11/1978 .......... A63C 11/265

* cited by examiner

*Primary Examiner* — Jamel E Williams
(74) *Attorney, Agent, or Firm* — Vichit Chea; Brooks Kushman P.C.

(57) ABSTRACT

A mechanical force gauge assembly includes a bracket, a housing, a hand member, a spring, a first ring, and a plunger. The bracket is for mounting to a vehicle frame. The housing is mounted to the bracket and defines a cavity and a housing cutout. The hand member is sized for disposal and translation within the cavity and defines an extension sized to extend through the housing cutout. The spring is disposed within the housing to bias movement of the hand member. The first ring is external to the housing and arranged with the extension to move in a first direction therewith. The plunger receives a force from a vehicle component secured to the vehicle frame. The plunger is arranged with the hand member such that the first ring moves to provide a force measurement reflective of the force received by the plunger.

13 Claims, 5 Drawing Sheets

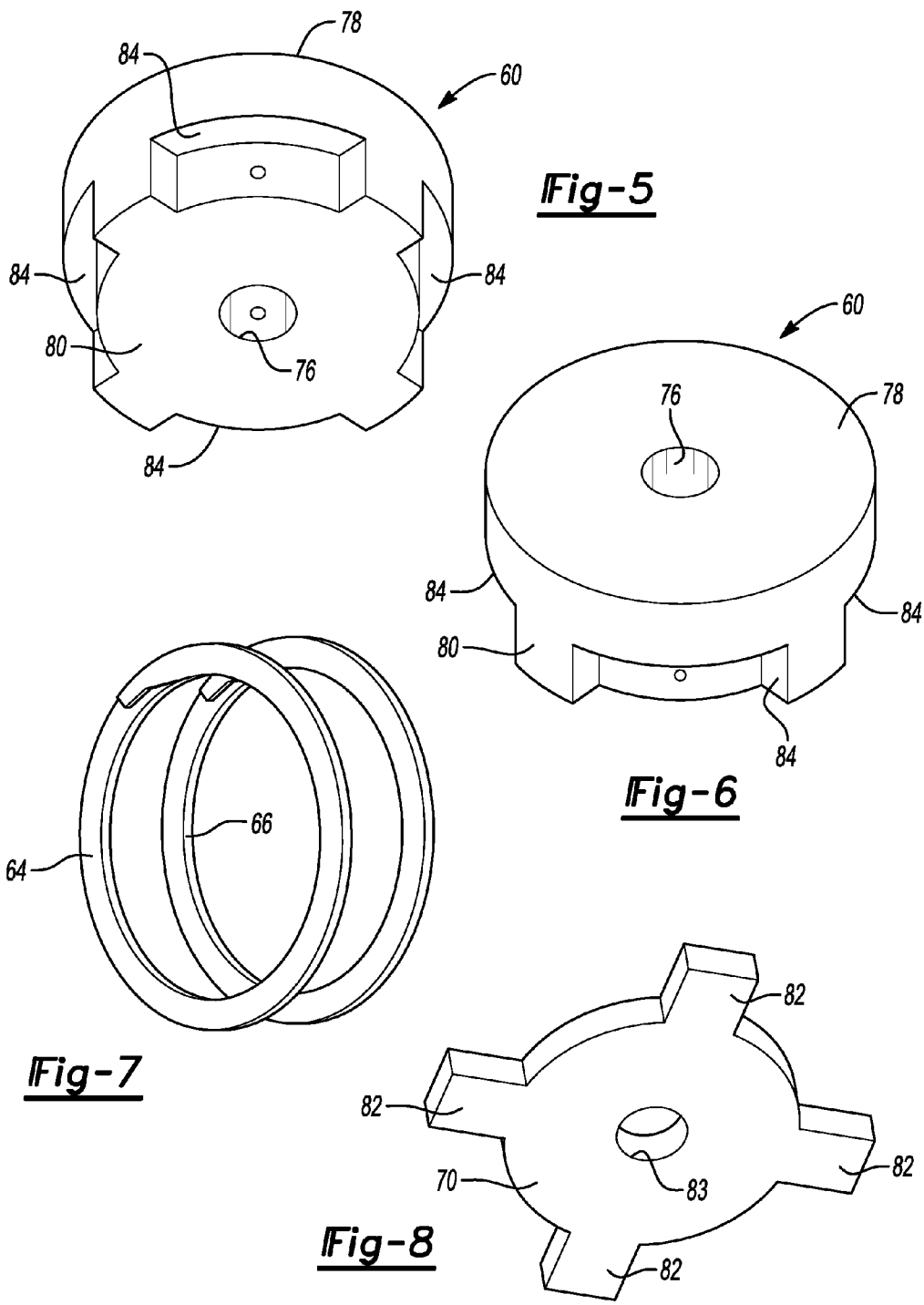

MECHANICAL FORCE GAUGE

TECHNICAL FIELD

The present disclosure relates to force gauge assemblies to measure forces received by vehicle components during assembly or manufacturing operations.

BACKGROUND

Vehicle components may undergo forces while traveling through various types of fluid baths during assembly or manufacturing operations. Measuring these forces may be difficult with electronic gauges due to the fluid. A mechanical force gauge assembly may operate when exposed to the fluids to provide force measurements of the vehicle components.

SUMMARY

A mechanical force gauge assembly includes a bracket, a housing, a hand member, a spring, a first ring, and a plunger. The bracket is for mounting to a vehicle frame. The housing is mounted to the bracket and defines a cavity and a housing cutout. The hand member is sized for disposal and translation within the cavity and defines an extension sized to extend through the housing cutout. The spring is disposed within the housing to bias movement of the hand member. The first ring is external to the housing and arranged with the extension to move in a first direction therewith. The plunger receives a force from a vehicle component secured to the vehicle frame. The plunger is arranged with the hand member such that the first ring moves to provide a force measurement reflective of the force received by the plunger. Indicia may be included on the housing and the force measurement may be further defined by movement of the first ring relative to the indicia to provide a measurement of the force received by the plunger. A second ring may be external to the housing and arranged with the extension to move in a second direction therewith. The first ring may be mounted to an external surface of the housing via a friction fit. The bracket may be mounted to the vehicle frame such that the plunger receives forces imparted thereupon from the vehicle component due to contact with fluid of a fluid bath. An end cap may define cutouts on a lower portion of the end cap spaced about a perimeter thereof and such that at least a portion of the end cap is disposed within the housing cutout. The end cap may further define an end cap aperture sized for the plunger to extend therethrough.

A force gauge assembly includes a housing, a hand member, a first spring, and a first ring. The housing defines a cavity and a cutout partially extending a length of the housing. The hand member is disposed within the cavity for translation and includes an extension extending through the cutout. The first spring biases movement of the hand member. The first ring is mounted upon an exterior of the housing for translation influenced by the extension when a first directional force is applied to the hand member. A plunger may be secured to the hand member and extend out of the cavity. The assembly may include a bracket to mount the housing to a vehicle frame such that the plunger is in contact with a vehicle component subjected to forces imparted thereupon by fluid from a fluid bath. A second ring may be mounted upon the exterior of the housing for translation influenced by the extension when a second directional force is applied to the hand member. Indicia may be included on the housing arranged with the first ring to provide a force measurement reflective of force applied to the hand member. A second spring may be disposed on an opposite side of the hand member relative to the first spring to bias movement of the hand member in a direction opposite the bias from the first spring. Indicia on the housing may be arranged with the first ring to provide a force measurement reflective of force applied to the hand member. The indicia may include marks identifying force measurement increments and each of the rings may be sized to cover only one of the marks. The assembly may not include any electrical components.

A force gauge assembly for a deck lid of a vehicle includes a bracket, a housing, indicia, a hand member, first and second springs, and first and second fit markers. The bracket is mounted to a frame of the vehicle. The housing is mounted to the bracket and defines a housing cutout. The indicia is on the housing. The hand member is sized for disposal and translation within the housing and includes an extension extending through the housing cutout. The first spring is disposed within the housing below the hand member to bias movement of the hand member in a first direction. The second spring is disposed within the housing above the hand member to bias movement of the hand member in a second direction. The first fit marker is external to the housing and is mounted thereupon. The second fit marker is external to the housing and mounted thereupon. The fit markers are arranged with the extensions such that a force applied to the hand member in the first direction or the second direction moves the fit markers relative to the indicia to provide a measurement of the force applied to the hand member. A plunger may be secured to the hand member at a first end and the bracket may be mounted to the vehicle frame such that a second end of the plunger is positioned to receive force inputs from a vehicle component mounted to the vehicle frame and due to fluids of a fluid bath. The indicia may include marks identifying force measurement increments and each of the fit markers may be sized to cover only one of the marks. The bracket may be mounted to the vehicle frame such that a second end of the plunger is positioned to receive force inputs from the deck lid mounted to the vehicle frame. The deck lid may be one of a hood or a trunk. An upper portion of the plunger may be secured to a vehicle component.

BRIEF DESCRIPTION OF THE DRAWINGS

FIG. 5 is a lower perspective view of an example of an end cap of the force gauge assembly of FIG. 2.

FIG. 6 is an upper perspective view of the end cap of FIG. 4.

FIG. 7 is a perspective view of an example of two rings of the force gauge assembly of FIG. 2.

FIG. 8 is a perspective view of an example of a force gauge hand of the force gauge assembly of FIG. 2.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
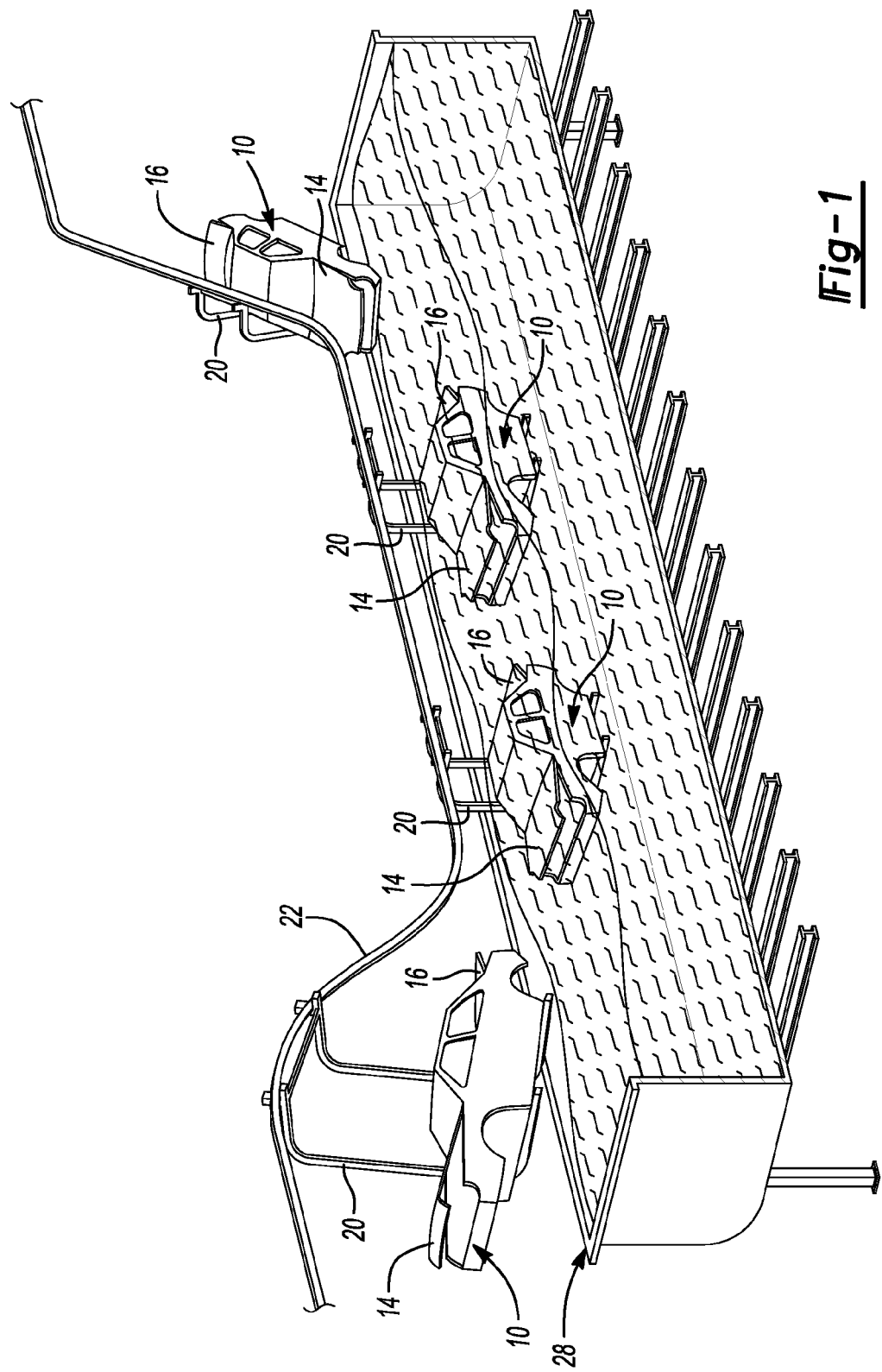
FIG. 1 is a perspective view of an example of a portion of an assembly line operation in which a vehicle frame is submerged and removed from a fluid bath.

FIG. 1 shows an example of a portion of an assembly line operation for a vehicle. A vehicle frame 10 is shown in four different positions. A forward deck lid 14 and a rear deck lid 16 are mounted to the vehicle frame 10. The vehicle frame 10 is shown suspended by a harness 20 secured to a rail 22. The rail 22 is shaped such that the vehicle frame 10 is submerged and then removed from a fluid bath 28. The fluid bath 28 may be an e-coat tank. The fluid in the e-coat tank may provide a coating to the vehicle frame 10, the forward deck lid, and the rear deck lid 16 to assist in preventing corrosion thereof. Other non-limiting examples of the fluid bath 28 include a phosphate tank and a rinse dip tank. As the vehicle frame 10 moves through the four positions shown in FIG. 1, components secured to the vehicle frame 10 receive forces from fluid within the fluid bath 28. In another example, the vehicle frame 10 may rotate three hundred and sixty degrees while traveling through a fluid bath, such as the fluid bath 28.

The forward deck lid 14 and the rear deck lid 16 may receive forces due to the fluid as the vehicle frame 10 travels through the fluid bath 28. The forces may occur in a first direction similar to a downward force relative to the vehicle frame 10 and a second direction similar to an upward force relative to the vehicle frame 10. The first and second directions may be representative of a tension or compression force measured by a force gauge assembly 40. The fluid may provide obstacles for a utilization of a digital force gauge to measure these forces. For example, the fluid may damage electrical components of the digital force gauge due to liquid and high temperature aspects of the fluid.

Figure 2:
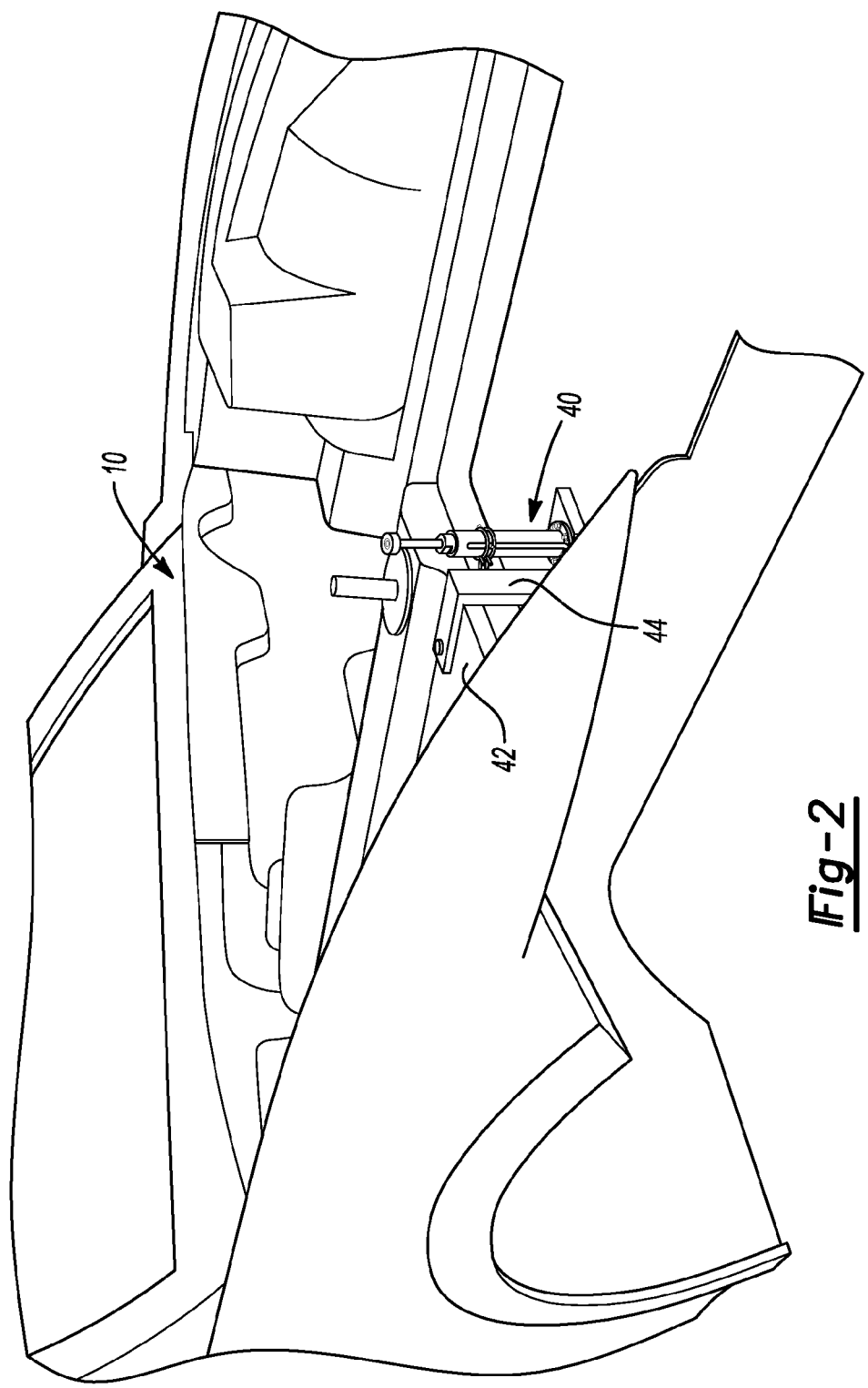
FIG. 2 is a perspective view of an example of a portion of a vehicle frame shown with a forward deck lid removed.

FIG. 2 shows a portion of the vehicle frame 10 with the forward deck lid 14 removed. The force gauge assembly 40 is mounted to a front rail 42 of the vehicle frame 10 via a bracket 44. For example, a location for mounting the force gauge assembly 40 may correspond to an area of a vehicle component, such as the forward deck lid 14, in which deformation or stress outside a predetermined threshold occurs. The bracket 44 is arranged with the front rail 42 such that the force gauge assembly 40 is mounted to measure forces applied to the forward deck lid 14 during submersion and removal from a fluid bath, such as the fluid bath 28. It is contemplated that the force gauge assembly 40 may also be mounted to other portions of the vehicle frame 10 to measure similarly applied forces. For example, the force gauge assembly 40 may be mounted to measure forces applied to the rear deck lid 16 or doors mounted to the vehicle frame 10.

Figure 3:
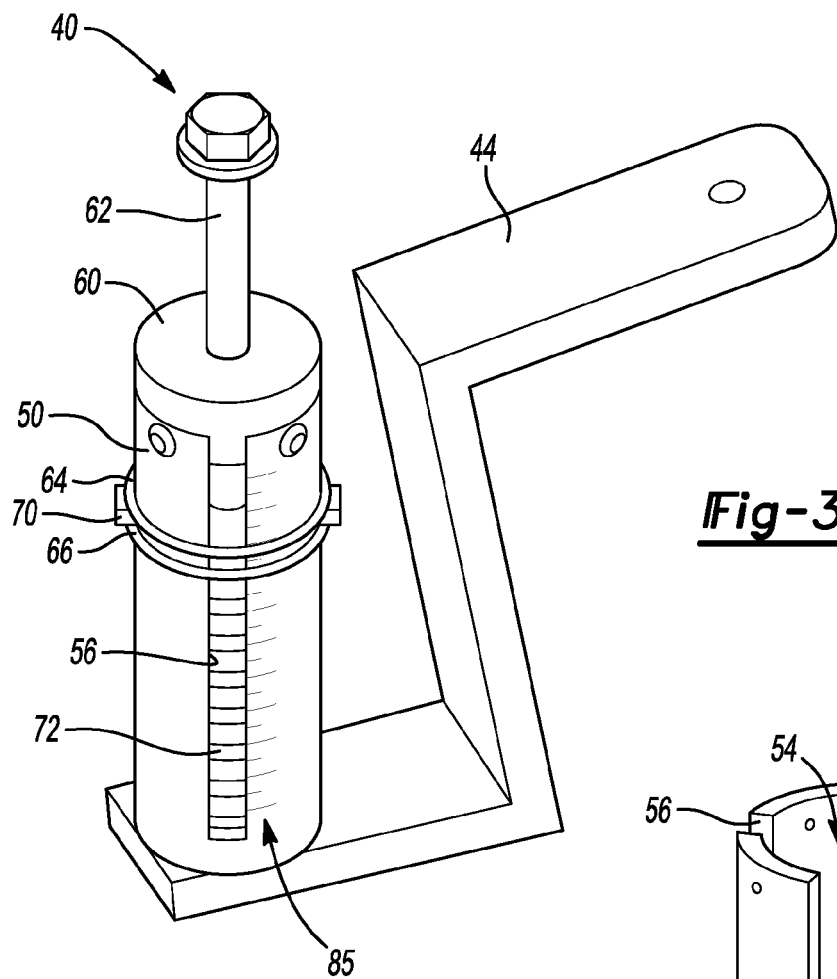
FIG. 3 is a perspective view of an example of a force gauge assembly.
Figure 4:
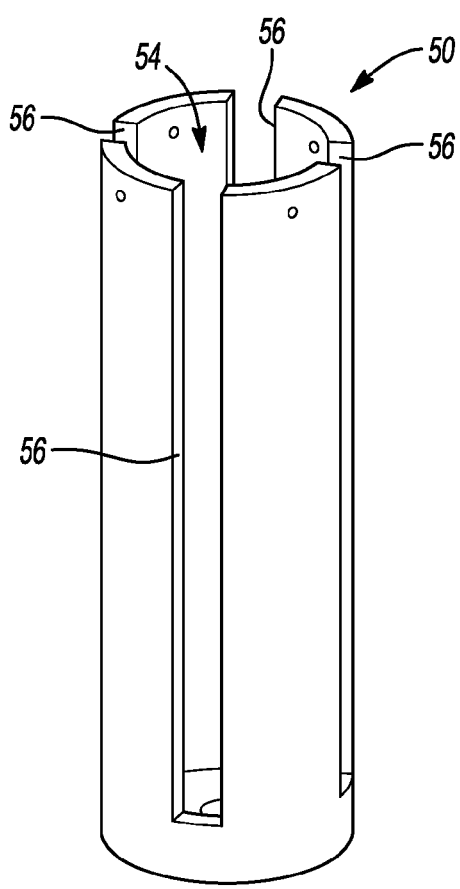
FIG. 4 is a perspective view of an example of a housing of the force gauge assembly of FIG. 2.

Components of the force gauge assembly 40 are shown in FIGS. 3 through 8. The force gauge assembly 40 may include a housing 50 mounted to the bracket 44. The housing 50 may define a cavity 54 and one or more housing cutouts 56. The one or more housing cutouts 56 may extend longitudinally along the housing 50. For example, the one or more housing cutouts 56 may substantially extend a length of the housing 50 as shown in FIG. 3. While the housing 50 is shown with a circular profile, it is contemplated that other geometries are available for the housing 50 and components of the force gauge assembly 40.

The force gauge assembly 40 may include an end cap 60, a plunger 62, a first ring 64, a second ring 66, a hand member 70, and a spring 72. For example, FIGS. 5 and 6 show the end cap 60. The end cap 60 may be sized to mount to the housing 50. The end cap 60 may define a plunger aperture 76 extending therethrough. The plunger aperture 76 may be sized for the plunger 62 to extend therethrough. The end cap 60 may include an upper portion 78 and a lower portion 80. The upper portion 78 may be cylinder shaped and correspond to a shape of the housing 50. The lower portion 80 may include cutouts 84 spaced about a perimeter of the lower portion 80. The cutouts 84 may be sized such that the lower portion 80 of the end cap 60 may be disposed within the cavity 54 and the one or more housing cutouts 56.

The first ring 64 and the second ring 66 may be mounted about the housing 50. For example, the first ring 64 and the second ring 66 may be external to the housing 50 and have a friction fit relationship with the housing 50 such that rings are mounted thereabout. The hand member 70 may be sized for disposal and translation within the cavity 54 of the housing 50. The hand member 70 may include extensions 82 sized to extend through corresponding cutouts of the one or more housing cutouts 56. The hand member 70 may define a hand aperture 83 sized to receive a portion of the plunger 62 for securement therein. For example, the plunger 62 and the hand member 70 may be secured to one another such that the hand member 70 moves when a force is applied to the plunger 62. Thus, the extensions 82 of the hand member 70 drive movement of the first ring 64 or the second ring 66 when a force is applied to the plunger 62 in either the first direction or the second direction as described above.

The first ring 64 and the second ring 66 may be arranged with a set of indicia 85 to provide force measurements based on movement of the rings and a compression ratio of the spring 72. The indicia may include marks, such as hash marks, identifying increments of force measurements. Each of the rings may be sized to cover only one of the marks to provide a user with clarity relating to a force measurement. The spring 72 may be sized for disposal within the housing 50 and arranged therein to bias movement of the hand member 70. For example, the spring 72 may be disposed within the housing 50 and below the hand member 70. The spring 72 may be secured to a lower portion of the housing 50 at one end and secured to the hand member 70 at another end. The spring 72 may be interchangeable such that springs of various compression ratios may be used with the force gauge assembly 40. The indicia 85 may be defined by the housing 50 or may be a separate component secured thereto.

As mentioned above, subjecting the vehicle frame 10 to fluid of the fluid bath 28 may impart forces on components mounted to the vehicle frame 10. In an example including the forward deck lid 14, the force gauge assembly 40 may be mounted to the vehicle frame 10 (FIG. 2) for arrangement with the forward deck lid 14 to measure forces received thereby. In one example, an upper portion of the plunger 62 may be secured to the component of which force applications are being measured. Prior to entering the fluid bath 28, the force gauge assembly 40 is mounted such that an initial load is received by the force gauge assembly 40 to assist in identifying whether any tension or upward force will be imparted upon the forward deck lid 14. As fluid influences movement of the forward deck lid 14, the plunger 62 will move accordingly, driving movement of the hand member 70 and the first ring 64 and/or the second ring 66. Once the vehicle frame 10 travels through the fluid bath 28, positioning of the first ring 64 and the second ring 66 relative to the indicia 85 indicates an amount of force received by the forward deck lid 14. For example, a positioning of the first ring 64 relative to the indicia 85 may indicate an amount of force received by the forward deck lid 14 as the forward deck lid 14 is driven upward relative to the vehicle frame 10. A positioning of the second ring 66 relative to the indicia 85 may indicate an amount of force received by the forward deck lid 14 as the forward deck lid 14 is driven downward relative to the vehicle frame 10.

Figure 9:
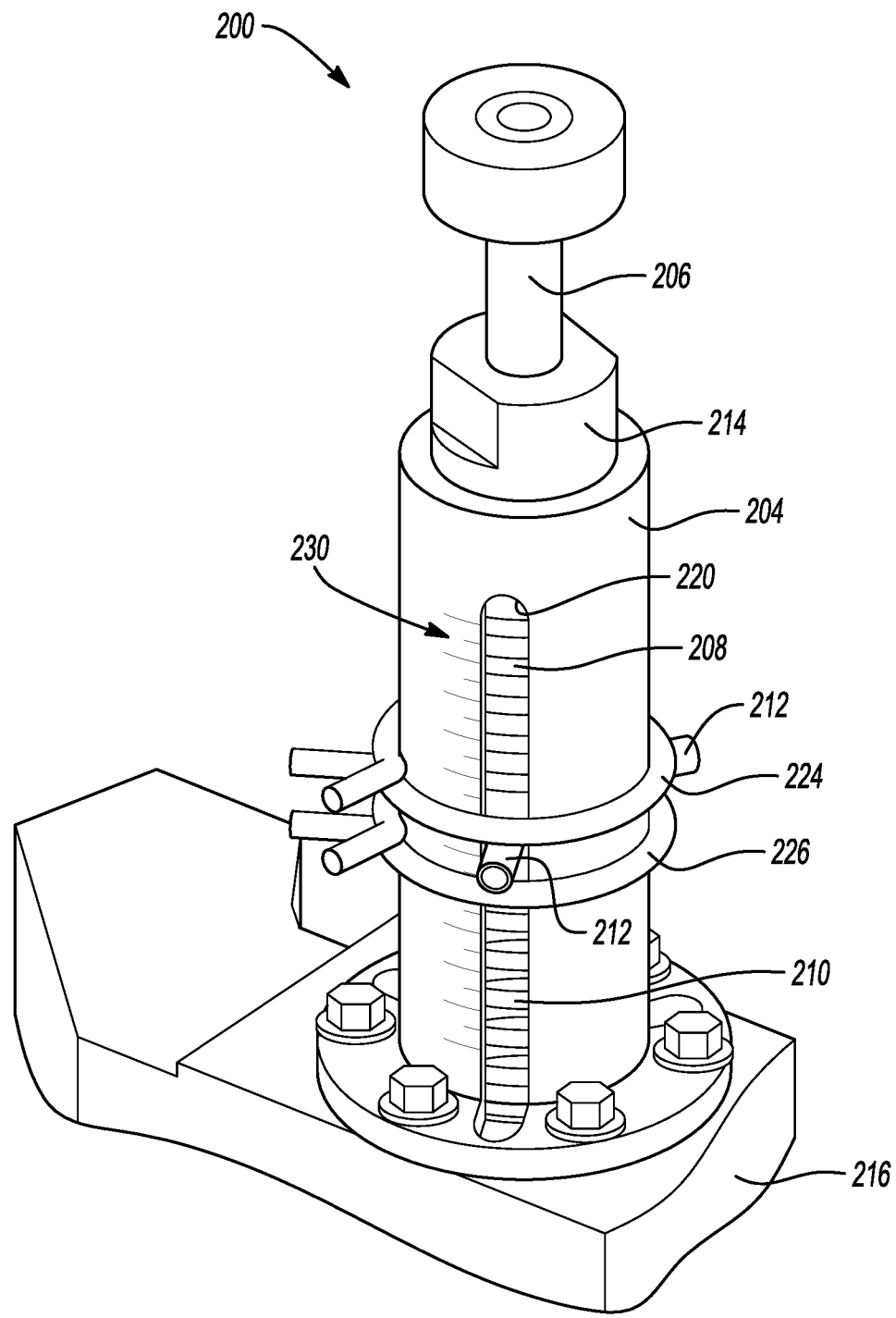
FIG. 9 is a perspective view of another example of a force gauge assembly.

FIG. 9 shows another example of a force gauge assembly, referred to as a force gauge assembly 200 herein. In this example, the force gauge assembly 200 may include a housing 204, a plunger 206, a first spring 208, a second spring 210, a force gauge hand 212, an end cap 214 and a bracket 216. The housing 204 may be mounted to the bracket 216. The bracket 216 may be mounted to a vehicle frame (not shown). For example, the bracket 216 may be mounted to a vehicle frame in a location for arrangement with a vehicle component to measure forces received by the vehicle component during an assembly or manufacturing process, such as the vehicle frame entering and exiting a fluid bath. The housing 204 may define one or more housing cutouts 220 for a portion of the force gauge hand 212 to extend therethrough. The force gauge hand 212 may also be referred to as a hand member.

The force gauge assembly 200 may also include a first fit marker 224 and a second fit marker 226. The first fit marker 224 and the second fit marker 226 may be ring-shaped and mounted external to the housing 204. For example, the first fit marker 224 and the second fit marker 226 may have a frictional fit relationship with the housing 204 and may be arranged with the force gauge hand 212 such that the force gauge hand 212 influences movement of the first fit marker 224 and the second fit marker 226.

For example, the first spring 208, the second spring 210, and the force gauge hand 212 may be sized for disposal and translation within the housing 204. The force gauge hand 212 may be disposed between the springs and be biased thereby. The first spring 208 and the second spring 210 may be secured within the housing 204 or may be free. Inclusion of the first spring 208 and second spring 210 within the housing 204 provides a normal condition in which the springs are biased against the force gauge hand 212 in opposing directions. The plunger 206 may extend through the end cap 214 and be secured to the force gauge hand 212 such that a force applied to the plunger 206 directs movement of the force gauge hand 212. An upper portion of the plunger 206 may be secured to the vehicle component of which force applications are being measured. The plunger 206 may be arranged with a vehicle frame such that forces received by a vehicle component secured to the vehicle frame are received by the plunger 206. For example, the plunger 206 may be in contact with a vehicle component such as a forward deck lid, a rear deck lid, or a door such that the force gauge assembly 200 may measure forces applied to the vehicle component. The portions of the force gauge hand 212 extending through the corresponding one or more housing cutouts 220 may thus move the respective fit marker according to a force applied to the plunger 206. A location of the first fit marker 224 or the second fit marker 226 relative to indicia 230 may indicate an amount of force applied to the vehicle component in communication with the plunger 206.

For example, the indicia 230 may be defined by the housing 204 or may be a separate component secured thereto. The indicia may include marks, such as hash marks, identifying increments of force measurements. Each of the fit markers may be sized to cover only one of the marks to provide a user with clarity relating to a force measurement. The first fit marker 224 and the second fit marker 226 may be arranged with the set of indicia 230 to provide force measurements based on movement of the markers and a compression ratio of the first spring 208 and/or the second spring 210. A force applied to the plunger 206 in an upward direction relative to the vehicle frame drives the first fit marker 224 upward to indicate a force measurement identified by a positioning of the first fit marker 224 relative to the indicia 230. A force applied to the plunger 206 in a downward direction relative to the vehicle frame drives the second fit marker downward to indicate a force measurement identified by a positioning of the second fit marker 226 relative to the indicia 230.

An example of an advantage for a two spring embodiment of a force gauge assembly is that both springs need only work in compression and therefore are not required to be fastened mechanically to either the force gauge hand 212 or the housing 204. This may provide for easier spring changes should the initial choice of spring prove to be too rigid or too compliant for the process being evaluated. This operation may require removal of clearance in the system when the gauge is initially fitted to the vehicle frame. This may be performed by winding in the end cap 214 until clearance with the first spring 208 is removed. This process sets the new 'equilibrium' position for the system to consider when calculating the overall maximum positive and negative loads in the first and second directions.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:
1. A mechanical force gauge assembly comprising:
a bracket for mounting to a vehicle frame;
a housing mounted to the bracket and defining a cavity and a housing cutout;
a hand member sized for disposal and translation within the cavity and defining an extension sized to extend through the housing cutout;

a spring disposed within the housing to bias movement of the hand member;

a first ring external to the housing and arranged with the extension to move in a first direction therewith; and a plunger to receive a force from a vehicle component secured to the vehicle frame, wherein the plunger is arranged with the hand member such that the first ring moves to provide a force measurement reflective of the force received by the plunger.

2. The assembly of claim 1 further comprising indicia included on the housing, wherein the force measurement is further defined by movement of the first ring relative to the indicia to provide a measurement of the force received by the plunger.

3. The assembly of claim 1 further comprising a second ring external to the housing and arranged with the extension to move in a second direction therewith.

4. The assembly of claim 1, wherein the first ring is mounted to an external surface of the housing via a friction fit.

5. The assembly of claim 1, wherein the bracket is mounted to the vehicle frame such that the plunger receives forces imparted thereupon from the vehicle component due to contact with fluid of a fluid bath.

6. The assembly of claim 1 further comprising an end cap defining cutouts on a lower portion of the end cap spaced about a perimeter thereof and such that at least a portion of the end cap is disposed within the housing cutout.

7. The assembly of claim 6, wherein the end cap further defines an end cap aperture sized for the plunger to extend therethrough.

8. A force gauge assembly comprising:

a housing defining a cavity and a cutout partially extending a housing length;

a hand member within the cavity, and including an extension extending through the cutout and a plunger;

a spring to bias member translation;

a ring mounted upon a housing exterior for extension-influenced translation; and a bracket to mount the housing to a vehicle frame for plunger contact with a vehicle component upon fluid force receipt.

9. The assembly of claim 8, further comprising a second ring mounted upon the housing exterior for translation influenced by the extension when a directional force is applied to the hand member.

10. The assembly of claim 8 further comprising indicia on the housing arranged with the ring to provide a force measurement reflective of force applied to the hand member.

11. The assembly of claim 8 further comprising a second spring disposed on an opposite side of the hand member relative to the spring to bias movement of the hand member in a direction opposite the bias from the spring.

12. The assembly of claim 8 further comprising indicia on the housing arranged with the ring to provide a force measurement reflective of force applied to the hand member, wherein the indicia include marks identifying force measurement increments, and wherein each of the ring and a second ring is sized to cover only one of the marks.

13. The assembly of claim 8, wherein the assembly does not include any electrical components.

* * * * *